US010429880B2

(12) United States Patent
Kull

(10) Patent No.: US 10,429,880 B2
(45) Date of Patent: Oct. 1, 2019

(54) MAGNETIC POSITIVE DETENT FOR HELICOPTER PILOT INPUT

(71) Applicant: Sikorsky Aircraft Corporation, Stratford, CT (US)

(72) Inventor: Jon Francis Kull, Plainville, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 319 days.

(21) Appl. No.: 15/117,981

(22) PCT Filed: Feb. 11, 2014

(86) PCT No.: PCT/US2014/015764
§ 371 (c)(1),
(2) Date: Aug. 10, 2016

(87) PCT Pub. No.: WO2015/122876
PCT Pub. Date: Aug. 20, 2015

(65) Prior Publication Data
US 2016/0357215 A1  Dec. 8, 2016

(51) Int. Cl.
*B64C 13/10* (2006.01)
*G05G 5/06* (2006.01)
*B64C 27/56* (2006.01)
*B64C 13/04* (2006.01)
*G05G 1/04* (2006.01)

(52) U.S. Cl.
CPC .............. *G05G 5/06* (2013.01); *B64C 13/04* (2013.01); *B64C 13/10* (2013.01); *B64C 27/56* (2013.01); *G05G 1/04* (2013.01)

(58) Field of Classification Search
CPC .......... G05G 5/06; B64C 13/04; B64C 13/10; B64C 27/56
See application file for complete search history.

(56) References Cited

U.S. PATENT DOCUMENTS

| | | | | |
|---|---|---|---|---|
| 2,827,789 | A * | 3/1958 | Oplinger | G05D 1/085 244/180 |
| 3,381,249 | A | 4/1968 | Younkin | |
| 4,539,862 | A * | 9/1985 | Caldwell | H01H 3/503 335/140 |
| 6,424,245 | B1 * | 7/2002 | Rector | G05G 5/05 335/220 |
| 6,720,852 | B2 * | 4/2004 | Farrey | H01H 36/0073 335/207 |
| 2003/0111120 | A1 * | 6/2003 | Aarestad | F15B 13/0422 137/636.1 |

(Continued)

OTHER PUBLICATIONS

International Search Report and Written Opinion for Application No. PCT/US2014/015764 dated Nov. 7, 2014; 12 pgs.

(Continued)

*Primary Examiner* — Justin M Benedik
(74) *Attorney, Agent, or Firm* — Cantor Colburn LLP

(57) ABSTRACT

A control system includes at least one lever configured to receive an operator input, a bellcrank coupled to the at least one lever and configured to rotate when the operator input exceeds a threshold, a support structure of the bellcrank which movably holds the bellcrank, and at least one magnet which forms a magnetic field which forms a positive detent between the bellcrank and the support structure of the bellcrank.

17 Claims, 4 Drawing Sheets

(56) References Cited

U.S. PATENT DOCUMENTS

| | | | | |
|---|---|---|---|---|
| 2008/0303618 A1* | 12/2008 | Prest | .................... | G06F 1/1616 |
| | | | | 335/229 |
| 2009/0266940 A1* | 10/2009 | Miller | .................... | B64C 13/10 |
| | | | | 244/223 |
| 2012/0144949 A1* | 6/2012 | Kim | .................... | F16H 59/105 |
| | | | | 74/473.33 |
| 2013/0207758 A1* | 8/2013 | Browne | ................ | H01F 7/0252 |
| | | | | 335/289 |

OTHER PUBLICATIONS

PBNation, "Field Testers Needed~Kila V2 Magnetic Detents", downloaded from http://www.pbnation.com/showthread.php?t=761947 on Oct. 28, 2013; 5 pgs.

\* cited by examiner

MAGNETIC POSITIVE DETENT FOR HELICOPTER PILOT INPUT

This application is a National Phase Application of Patent Application PCT/US2014/015764 filed on Feb. 11, 2014, the contents of which are incorporated herein by reference in their entirety.

BACKGROUND

Detents are present on aircraft for pilot assistance. For ease of use, most aircraft controls have detents about a neutral position. So-called return features are typically provided such that, in the absence of input, the control is restored or returned to the neutral position.

Conventional detents include spring capsules with an adjustable preloaded spring that provides resistance to movement from the neutral position. Another conventional detent includes a cam and follower system, which is also usually adjustable with a spring having a known force or spring constant that must be overcome to displace the control from the neutral position. Both of these detents are costly and time consuming to design and manufacture. Moreover, given the presence of the controls on an aircraft, additional features must be included in case of jamming.

BRIEF SUMMARY

An embodiment is directed to a method of installing a detent comprising: deploying a pair of magnets in a control system of an aircraft, wherein the magnets are configured based on a breakout force needed to overcome a magnetic detent of the control system.

In some embodiments, deploying the magnets comprises mounting the magnets at a specified location of the control system.

In some embodiments, deploying the magnets comprises installing the magnets internal to a pedal or stick control module.

In some embodiments, the aircraft comprises a helicopter, and wherein the control system is associated with at least one of: collective controls, cyclic controls, and yaw controls.

In some embodiments, the magnets are permanent magnets.

In some embodiments, the method further comprises receiving feedback regarding the magnetic detent, and adjusting at least one parameter associated with the magnetic detent based on the feedback.

In some embodiments, the adjusting of the at least one parameter comprises at least one of selecting a second pair of magnets to replace or supplement the deployed magnets, and modifying a distance between the deployed magnets.

An embodiment is directed to a control system comprising: at least one lever configured to receive an operator input, a bellcrank coupled to the at least one lever and configured to rotate when the operator input exceeds a threshold, a support structure of the bellcrank which movably holds the bellcrank, and at least one magnet which forms a magnetic field which forms a positive detent between the bellcrank and the support structure of the bellcrank.

In some embodiments, the at least one magnet which forms the magnetic field comprises a first magnet attached in the bellcrank and a second magnet attached to the support structure of the bellcrank.

In some embodiments, the at least one magnet is selected to require a breakout force to be provided by a pilot of an aircraft via the operator input in an amount that exceeds the threshold for the bellcrank to rotate.

In some embodiments, the at least one magnet is installed internal to a pedal or stick control module of an aircraft.

In some embodiments, the control system is associated with at least one of: collective controls, cyclic controls, yaw controls, or combinations thereof.

In some embodiments, the bellcrank and support structure are designed with non-magnetic aluminum.

In some embodiments, the control system further comprises a linkage coupled to the at least one lever and to the bellcrank.

In some embodiments, the at least one magnet comprises a neodynium magnet.

An embodiment is directed to a helicopter comprising a control system, such as one or more of the control systems described herein.

An embodiment is directed to a vehicle comprising a control system, such as one or more of the control systems described herein.

Additional embodiments are described below.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
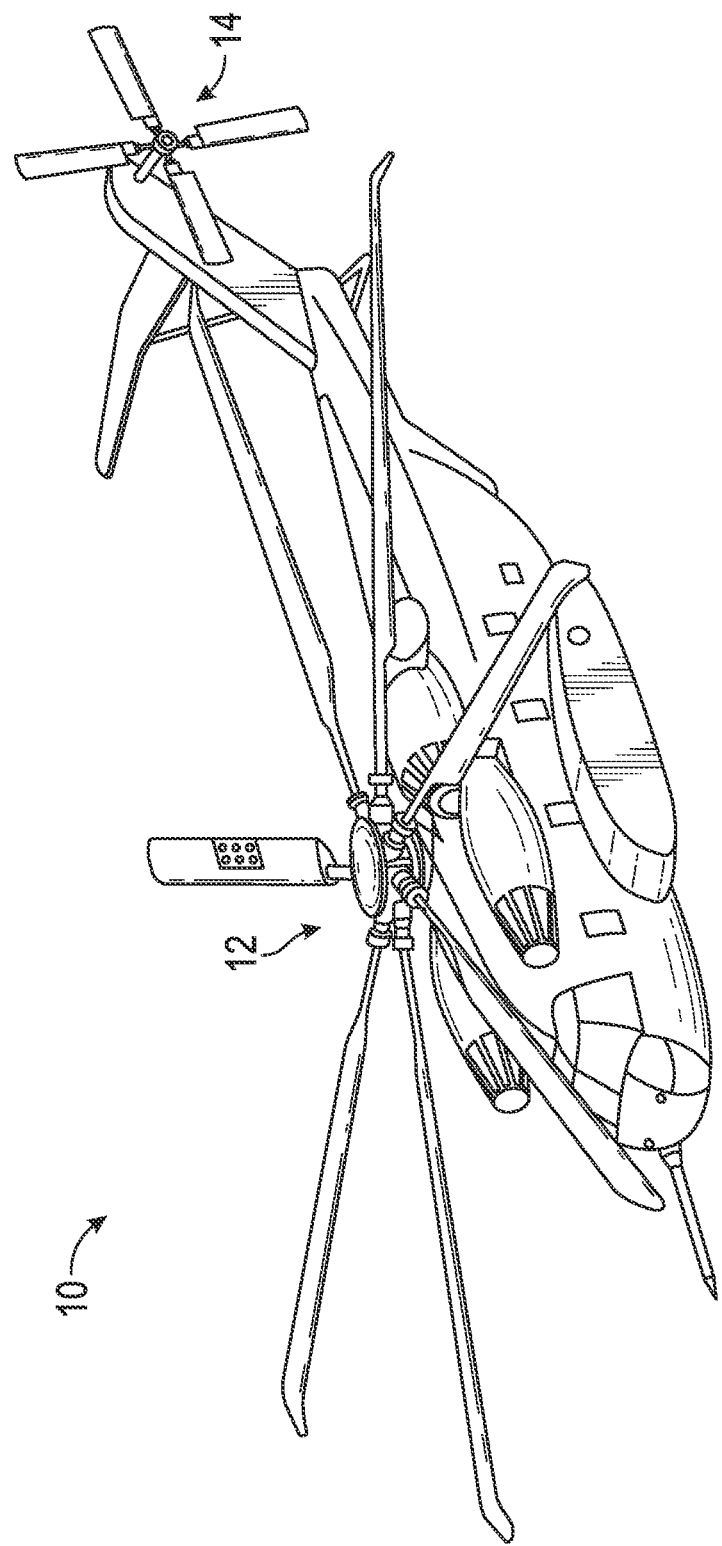
FIG. 1 is a general perspective side view of an exemplary aircraft.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this respect, a coupling between entities may refer to either a direct or an indirect connection.

Exemplary embodiments of apparatuses, systems, and methods are described regarding the design and use of a detent, such as a magnetic positive detent. The detent may be used in connection with an aircraft. For example, the detent may be associated with a rotorcraft (e.g., helicopter) pilot input. The strength of the detent may be based on a strength of a selected magnet and a distance between magnets.

Referring now to FIG. 1, a general perspective view of a helicopter 10 is shown. The helicopter 10 includes a main rotor assembly 12 and tail rotor assembly 14. Although a particular helicopter configuration is illustrated and described in the disclosed embodiment, other configurations and/or machines (e.g., other aircraft configurations) may be used in connection with this disclosure such as coaxial helicopters, helicopters with pusher propellers, or fixed wing aircraft.

Figure 2:
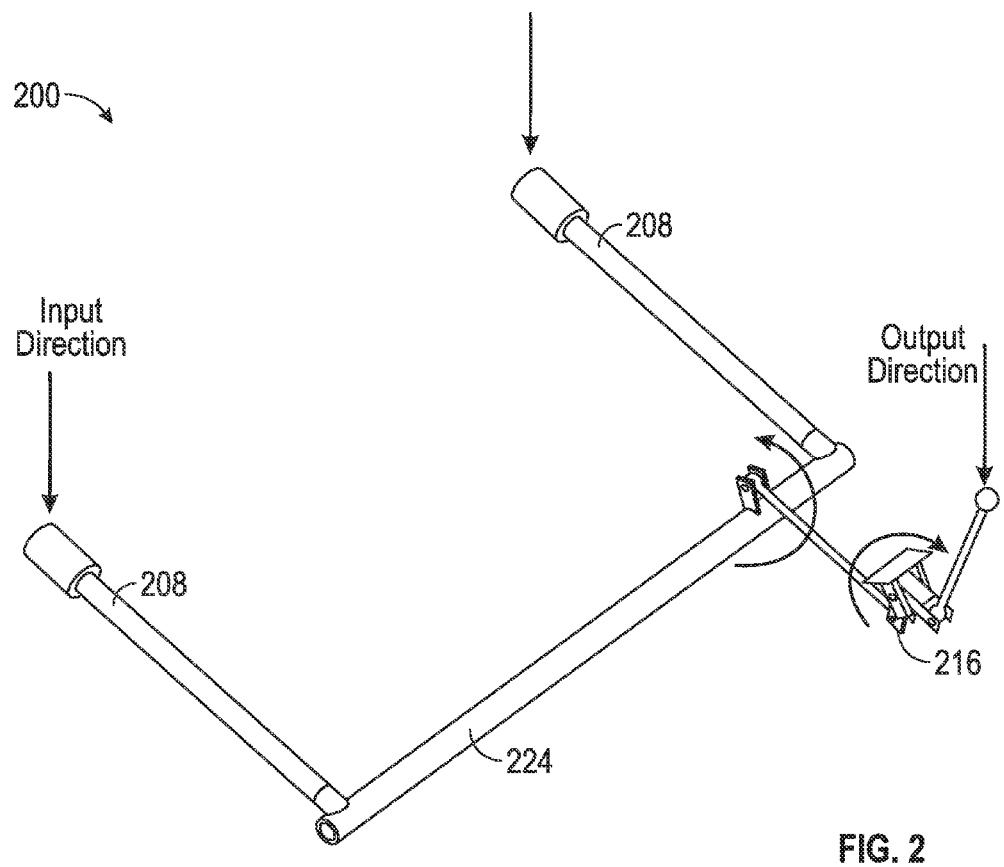
FIG. 2 is a block diagram of an exemplary control system.

Turning to FIG. 2, a control system 200 in accordance with one or more embodiments is shown. The system 200 may include levers 208. The levers 208 may be used to enable an operator (e.g., a pilot) to apply an input force. For example, the operator may push down on the levers 208 in the input direction shown in FIG. 2. Of course, one skilled in the art would appreciate that the operator could also pull up on the levers 208, such that the input direction would point upwards in such an instance. While described in the context of a human pilot, it is understood that aspects could be used in automated pilot control systems or optionally piloted control systems. Further, while shown with dual levers 208, it is understood that the control system 200 can have a single lever or more than two levers in other aspects.

Based on the downward applied input to the levers 208 shown in FIG. 2, a bellcrank 216 may be caused to rotate in an output direction as shown. The bellcrank 216 may rotate based on a linkage 224 between the levers 208 and the bellcrank 216. While shown as having opposite rotational directions, it is understood that the control system 200 could have the output direction be in the same rotational direction as the linkage 224 in other aspects.

Figure 3:
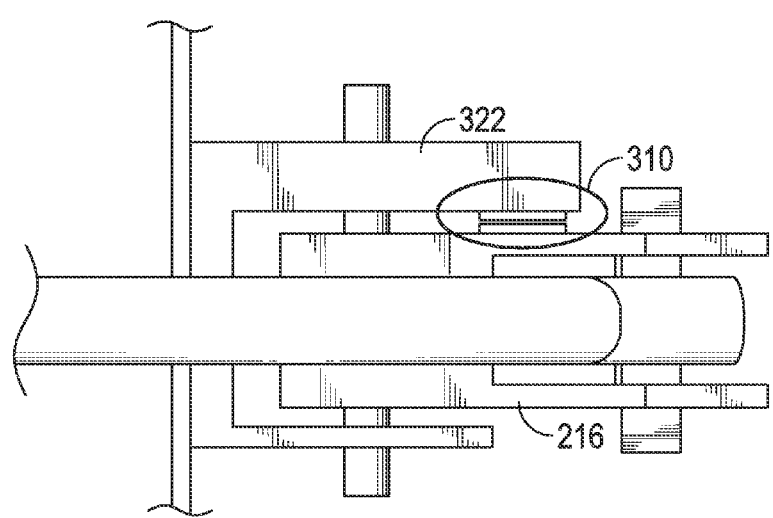
FIG. 3 illustrates an exemplary magnetic detent.

In order to keep the bellcrank 216 from rotating in the absence of an applied input to the levers 208, a detent may be used. An example of such a detent is shown in FIG. 3. The detent may correspond to two magnets 310. A first of the magnets 310 may be staked in, or coupled to, the bellcrank 216. A second of the magnets 310 may be staked in, or coupled to, a support structure 322 for the bellcrank 216. The first and second magnets 310 may be oriented to attract one another, thereby creating a positive detent. In some embodiments, one or both of the first and second magnets 310 may include a permanent magnet. The magnets 310 may be neodymium magnets.

While shown with a simplified linkage 224 between the levers 208 and the bellcrank 216, it is understood that additional linkages could be used to transmit force and that the detent could be disposed in these additional linkages in other aspects. While shown with a pair of magnets, in other aspects, only a single magnet 310 in conjunction with a magnetizable material may be used. By way of example, where one of the magnets 310 is attached to the bell crank 216 and the support structure 322 is made of a magnetizable material such as steel, the requisite magnetic force between the bell crank 216 and support structure 322 is created.

The strength of the magnets 310 and the distance between the magnets 310 may be selected to control the force needed to be applied at the levers 208 to break or overcome the detent. Typically, the mechanical components of the system 200 are held to tight tolerances, such that the distance between the first and second magnets 310 is also well-controlled. As such, the force needed to be applied at the lever 208 to break or overcome the detent would be repeatable.

Figure 4:
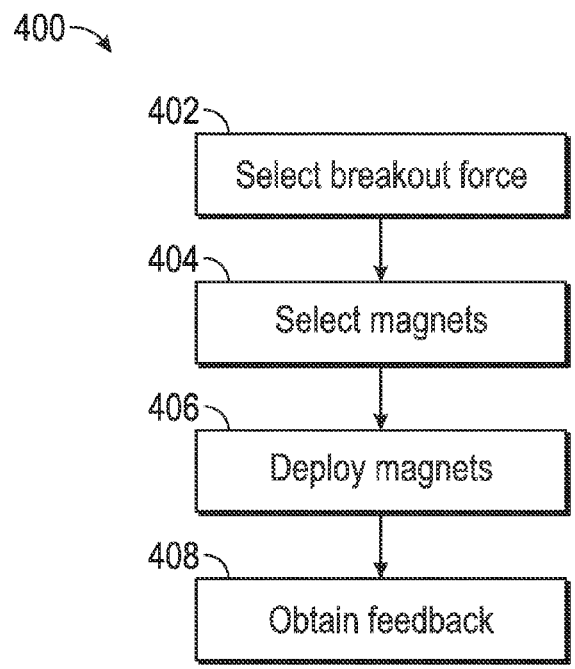
FIG. 4 illustrates a flow chart of an exemplary method.

Turning now to FIG. 4, a flow chart of an exemplary method 400 is shown. The method 400 may be executed in connection with one or more systems, components, or devices, such as those described herein. The method 400 may be used to provide a magnetic detent for a control system of an aircraft.

In block 402, a desired breakout force needed to overcome a detent may be selected. The breakout force may be selected based on a specification or requirement associated with a given control system.

In block 404, magnets may be selected. The selection of the magnets may be based on the breakout force selected in block 402. The selection of the magnets may be based on a mounting location for the magnets, which may be a function of the control system.

In block 406, the magnets may be deployed. For example, as part of block 406, the magnets may be mounted at a specified location of the control system.

In block 408, feedback may be obtained from an operator of the control system regarding the magnetic detent. If the feedback indicates a lack of satisfaction with the detent, one or more parameters associated with the detent may be adjusted. For example, different magnets may be selected to replace or supplement the current/existing magnets, or a distance between the magnets may be modified.

The method 400 is illustrative. In some embodiments, one or more of the blocks or operations (or a portion thereof) may be optional. In some embodiments, one or more additional blocks or operations not shown may be included. In some embodiments, the blocks or operations may execute in an order or sequence that is different from what is shown in FIG. 4.

In some embodiments, a magnet installed in a bellcrank may be designed to rotate, e.g., +/−10 degrees. As described above, one or more magnets may be installed as part of the bellcrank and/or as part of a fixed support. In some embodiments, magnets may be initially inline, with a 0.020 inch gap. A detent force of approximately 5 pounds may be provided.

Figure 5A:
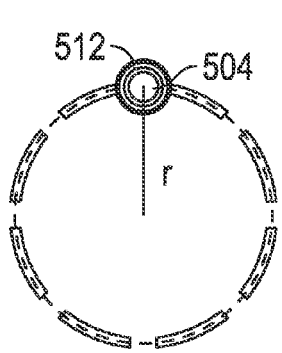
FIGS. 5A-5B illustrate an exemplary design application.
Figure 5B:
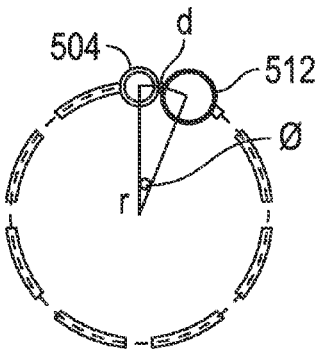

Referring to FIGS. 5A-5B, an application example in accordance with one or more embodiments is shown. In FIG. 5A, a first magnet 504 coupled to a fixed support and a second magnet 512 coupled to a rotating bellcrank are shown in a first position. The magnets 504 and 512 may each generally reside at a location or distance from a center of the bellcrank corresponding to a radius 'r' of a circle. In some embodiments, the radius 'r' may be equal to 1 inch. The magnets 504 and 512 might not be rotated or displaced relative to one another in FIG. 5A.

In FIG. 5B, the magnet 512 is shown as having been rotated at an angle 'φ' relative to the positioning of the magnet 512 in FIG. 5A. The displacement 'd' of the magnet 512 may be calculated as: $d=2*r*\sin(\phi/2)$. Thus, if 'φ' equals 10 degrees and 'r' equals 1 inch, 'd' may be equal to 0.174 inches. The detent can be set to where the magnetic force maintains the magnets 512, 504 in alignment or returns them to alignment as shown in FIG. 5A when within a given displacement d, but is insufficient to force the magnets 512, 504 back into alignment when outside of the displacement d.

Figure 6A:
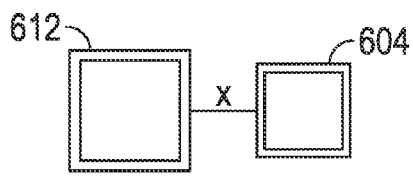
FIGS. 6A-6B illustrate an exemplary design application.
Figure 6B:
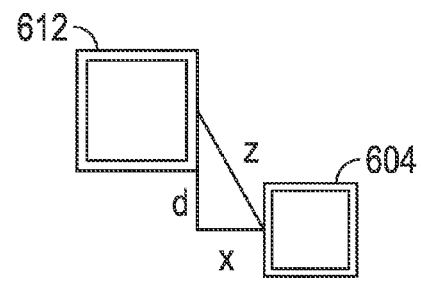

Referring to FIGS. 6A-6B, an application example in accordance with one or more embodiments is shown. The application of FIGS. 6A-6B may be analogous to the embodiment of FIGS. 5A-5B, but may include a small offset or gap between magnets. Specifically, in FIG. 6A, a first magnet 604 that may be coupled to a fixed support and a second magnet 612 that may be coupled to a rotating bellcrank are shown in a first position. The magnets 604 and 612 may be offset from one another by a distance 'x'. In some embodiments, 'x' may be equal to 0.020 inches.

In FIG. 6B, the magnet 612 may have been moved relative to the positioning of the magnet 612 in FIG. 6A. Specifically, the magnet 612 may be moved by a distance 'd' in a direction that is substantially perpendicular to the direction 'x'. Accordingly, a total distance 'z' between the magnets 604 and 612 may be approximated as a hypotenuse of right triangle: $z=\sqrt{x^2+d^2}$. Thus, if 'x' equals 0.020 inches and 'd' equals 0.174 inches, then 'z' may equal 0.175 inches. For a small offset or gap 'x' and small angle of rotation 'φ', 'z' may approximately be equal to 'd'.

In some embodiments, a magnetic force of cylinders may be solved numerically to relate, e.g., magnetic force to distance. Relative to a theoretical calculation, the actual force at a given distance in practice may be less due to an interaction of magnetic field lines away from an axis of action. In some embodiments, an attraction force at full travel may be preferred to aid a return to a center or neutral position.

Figure 7A:
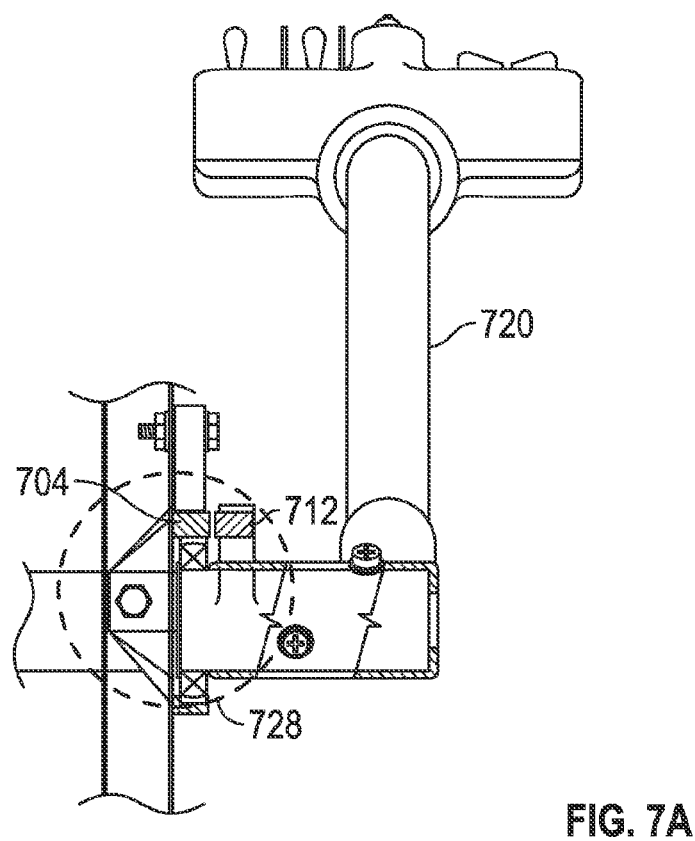
FIGS. 7A-7B illustrate an exemplary installation for a collective channel.
Figure 7B:
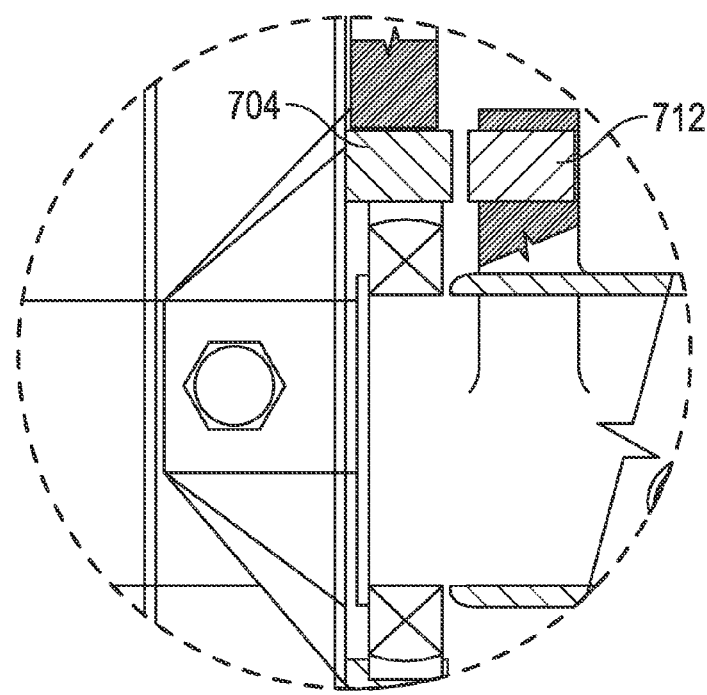

Referring to FIGS. 7A-7B, an application example in accordance with one or more embodiments is shown.

In FIG. 7A, a first magnet 704 that may be coupled to, or staked in, a fixed support or support bracket and a second magnet 712 that may be coupled to, or staked in, a rotating stick assembly 720 are shown. The stick assembly 720 may correspond to a pilot collective stick assembly. The portion of FIG. 7A denoted by dashed circle 728 is shown in greater detail in FIG. 7B.

In FIG. 7B, the magnets 704 and 712 are shown as having an offset or gap of 'x', which may be equal to 0.020 inches.

In some embodiments, magnets may be used to provide a detent with no moving parts. Therefore, such a detent is not susceptible to jamming. The use of the magnets as a detent provides for a simplistic design and dramatically reduces engineering and maintenance costs. The magnets may allow the detent to function in a number of directions (e.g., rotational directions). Machined bellcranks and supports are typically designed with non-magnetic materials (e.g., non-magnetic aluminum). As such, the bellcranks and supports will not impact the performance of the magnetic detent.

Use of magnets as part of a detent reduces costs associated with design, fabrication, deployment and maintenance relative to conventional detents. One merely has to specify a pair of magnets and a mounting location as part of the design process. Since the magnets may be staked into existing components, the magnets add very little weight and little to no volume to an existing system. If during operator evaluation the detent is deemed inadequate, it would be possible to specify two new magnets and replace them without having to undergo a major redesign process.

In some embodiments, such as in connection with legacy mechanical systems, a magnetic detent may be used to provide a cheap alternative to match more expensive aircraft solutions. On more current fly-by-wire aircraft, the magnetic detent would further eliminate lower reliability mechanical parts from a control system. The magnetic detents may be installed internally to a pedal or stick control modules.

Aspects of the disclosure may be used in connection with one or more control systems, such as one or more control systems associated with an aircraft. For example, in the context of a helicopter, a detent may be used in connection with collective controls, cyclic controls, or yaw controls. Additionally, while described in the context of aircraft, it is understood that aspects could be used in other forms of control systems, such as those for industrial machinery, or vehicles such as locomotives, cars, trucks, boats, or ships.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional.

What is claimed is:

1. A method of installing a detent comprising:
   deploying a pair of magnets in a control system of an aircraft to prevent movement of the component of the control system absent an input force, wherein the pair of magnets is aligned absent an input force and one of the pair of magnets generates a constant magnetic field;
   wherein a strength of the pair of magnets and a distance between the pair of magnets is selected based on a breakout force needed to overcome a magnetic detent of the control system, wherein the magnetic detent is overcome when the input force exceeds the breakout force.

2. The method of claim 1, wherein deploying the magnets comprises mounting the magnets at a specified location of the control system.

3. The method of claim 1, wherein deploying the magnets comprises installing the magnets internal to a pedal or stick control module.

4. The method of claim 1, wherein the aircraft comprises a helicopter, and wherein the control system is associated with at least one of: collective controls, cyclic controls, and yaw controls.

5. The method of claim 1, wherein the magnets are permanent magnets.

6. The method of claim 1, further comprising:
   receiving feedback regarding the magnetic detent; and
   adjusting at least one parameter associated with the magnetic detent based on the feedback.

7. The method of claim 6, wherein the adjusting of the at least one parameter comprises at least one of:
   selecting a second pair of magnets to replace or supplement the deployed magnets, and
   modifying a distance between the deployed magnets.

8. A control system comprising:
   at least one lever configured to receive an operator input;
   a bellcrank coupled to the at least one lever and configured to rotate when the operator input exceeds a threshold;
   a support structure of the bellcrank which movably holds the bellcrank; and
   at least one magnet which forms a constant magnetic field, wherein the magnetic field which forms a positive detent between the bellcrank and the support structure of the bellcrank when the bellcrank and the support structure are aligned within a given displacement.

9. The control system of claim 8, wherein the at least one magnet which forms the magnetic field comprises a first magnet attached in the bellcrank and a second magnet attached to the support structure of the bellcrank.

10. The control system of claim 8, wherein the at least one magnet is selected to require a breakout force to be provided by a pilot of an aircraft via the operator input in an amount that exceeds the threshold for the bellcrank to rotate.

11. The control system of claim 8, wherein the at least one magnet is installed internal to a pedal or stick control module of an aircraft.

12. The control system of claim 8, wherein the control system is associated with at least one of: collective controls, cyclic controls, yaw controls, or combinations thereof.

13. The control system of claim 8, wherein the bellcrank and support structure are designed with non-magnetic aluminum.

14. The control system of claim 8, further comprising:
a linkage coupled to the at least one lever and to the bellcrank.

15. A helicopter comprising the control system of claim 8.

16. The control system of claim 8, wherein the at least one magnet comprises a neodynium magnet.

17. A vehicle comprising the control system of claim 8.

* * * * *